Nov. 12, 1963 S. W. BLOM 3,110,088

METHOD OF MAKING RESISTANCE ELEMENTS

Filed April 6, 1962

INVENTOR
Stanford W. Blom
BY
J. William Carson
ATTORNEY 3,110,088
METHOD OF MAKING RESISTANCE ELEMENTS
Stanford W. Blom, Dunellen, N.J., assignor to Specialties Development Corporation, Belleville, N.J., a corporation of New Jersey
Filed Apr. 6, 1962, Ser. No. 186,824
4 Claims. (Cl. 29—155.5)

The present invention relates to resistance elements such as thermistors of the spot type, and, more particularly, to an improved method of making such elements.

Resistors or semi-conductors which vary in resistance appreciably with changes in temperature are generally known as thermistors. So-called spot-thermistors usually are utilized in electrical networks to compensate for ambient temperature changes whereby the characteristic of the networks is not affected by such changes in temperature. It is therefore essential that the behavior of all similarly rated spot-thermistors is identical and predictable.

One of the most commonly used methods is to form a small body of thermistor material and then to secure terminal or lead wires to the body by means of silver cement. This method is performed manually and requires a skilled operator. The uniformity of the thermistors so made is practically entirely dependent on the care and accuracy exercised by the operator. Any slight variation in the amount and thickness of the mass of silver cement is sharply reflected by the electrical characteristics of the thermistor element. Consequently, each element must be tested, and only those which pass inspection within close tolerances can be rated.

It has been found that this method is costly because of the labor required and the high percentage of elements which are rejected after the labor has been spent thereon. As a result of this laborious and inefficient technique, spot-thermistors at present are very expensive in relation to their weight which seldom exceeds several grains.

Accordingly, an object of the present invention is to provide a method of making resistance elements of the spot type which eliminates the foregoing difficulties and disadvantages.

Another object is to provide such a method which is simple, practical, reliable and economical.

Another object is to provide such a method whereby uniform and identical elements are produced in large numbers without primarily depending on the skill of the operator.

A further object is to provide such elements at a very low cost.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by forming a continuous mass of resistance material having a substantially uniform cross-sectional area throughout its length on a pair of parallel spaced apart electrically conductive wires of indefinite continuous length, removing certain portions of the mass from the wires, and severing the wires at one end of the remaining portions of the mass to separate the remaining portions and provide resistance elements having a pair of terminal wires.

A preferred embodiment of the invention has been chosen for purposes of illustration and description, and is shown in the accompanying drawing, forming a part of the specification wherein.

Figure 1:
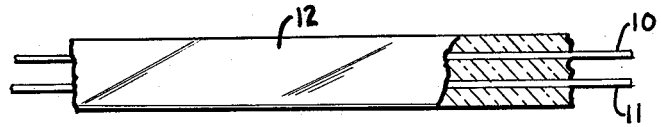
FIG. 1 is a fragmentary elevational view, partly in section, illustrating a mass of resistance material formed on the wires.

Referring to FIG. 1 of the drawing in detail, there is shown a pair of electrically conductive wires 10 and 11 which are parallel and spaced apart, and a continuous mass of resistance material 12 formed on the wires which has a substantially uniform cross-sectional area throughout its length.

In order to form the mass on the wires in a rapid and efficient manner while maintaining the wires parallel and uniformly spaced apart, the material 12 is extruded onto the wires by apparatus such as shown in United States Letters Patent 2,596,285.

Any suitable material may be utilized which is adapted for extrusion, but the selection of any particular material depends upon the function and the electrical characteristics the element is intended to have. An example of a suitable extrudable thermistor composition is illustrated in United States Letters Patent 2,785,142. While this composition is particularly useful for detecting overheat, it will be appreciated that other extrudable compositions adapted for temperature or voltage compensation could be formed into elements by employing the present process.

Figure 2:
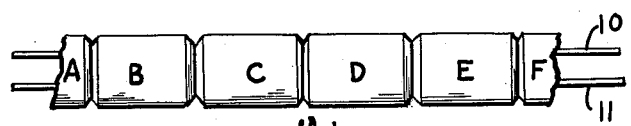
FIG. 2 is a fragmentary elevational view illustrating the mass after being notched to provide bead-like sections.

In FIG. 2, the mass 12 is shown notched at lengthwise spaced apart points to form a series of partially connected bead-like sections A, B, C, D, E, and F. The mass, as shown, is regularly notched at equidistantly spaced apart points, but the location of the notches may be varied as will be explained hereinafter.

The mass 12, for example, may have a diameter of between about .020 and about .250 inch, and the sections may have a length of between about .040 and about .250 inch. The wires may have a diameter of between about .001 and about .015 inch, and usually are spaced apart between about .005 and about .200 inch.

Figure 3:
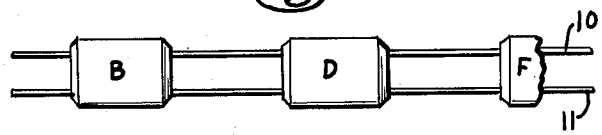
FIG. 3 is a fragmentary elevational view illustrating certain sections removed from the wires.

In FIG. 3, certain unwanted bead-like sections have been removed from the wires, preferably at regularly spaced intervals. As shown, alternate unwanted sections A, C and E are removed, whereby wanted sections B, D and F remain adhered to the wires.

Figure 4:
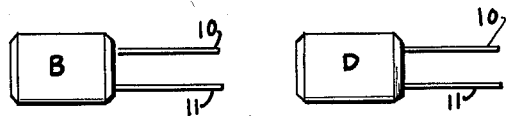
FIG. 4 is an elevational view of two thermistor elements produced from the wires and sections shown in FIG. 3 by severing the wires.

In FIG. 4, the wires 10 and 11 have been severed at the left end (as viewed) of the sections B, D and F to provide thermistor elements B and D having a pair of terminal wires 10 and 11 at one end thereof.

In carrying out the method in the preferred manner, the notches in the mass are formed soon after the material has been extruded into the wires, that is, while the material is soft and is readily notched without distortion of the bead-like sections. The notched mass is then air dried, and the alternate sections are removed while the material is soft and has not been dried in a manner to firmly adhere to the wires. Such removal may be effected by crushing, abrading or scraping these unwanted sections and wiping or abrading away any material tending to adhere to the wires to thereby clean the wires. The removed material may be salvaged and reconditioned for further extrusion. The elements are then sintered to fuse and firmly adhere each bead-like section onto the wires, whereby the elements remain connected to the end of the process and the sections and wires can be handled as a continuous length of product. The wires are then severed to provide a pair of lead or terminal wires adapted for electrical connection.

Alternatively, the wires could be cut to provide individual elements which are thereafter sintered.

Figure 5:
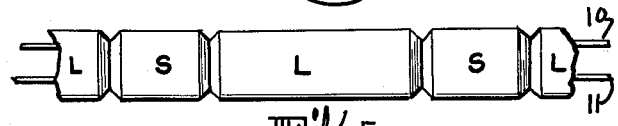
FIG. 5 is a fragmentary elevational view illustrating another manner of notching the mass of material to form bead-like sections.
Figure 6:
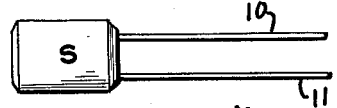
FIG. 6 is an elevational view of an element produced from the wires and sections shown in FIG. 5.

In FIG. 5, the mass is shown notched in a manner to provide alternate long and short bead-like sections L and S. Upon removal of the unwanted long sections L, the terminal wires (FIG. 6) are of greater length than those provided as shown in FIG. 4, whereby electrical connection is facilitated.

Such longer terminal can also be provided by two adjacent sections and leaving each section adjacent the removed sections. For example, this can be accomplished by removing unwanted sections A, B, D, and E (FIG. 2) and leaving wanted sections C and F.

Figure 7:
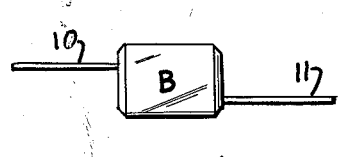
FIG. 7 is an elevational view of an element produced by severing the wires in another manner.

In FIG. 7, a bead-like section B is shown which is produced by severing the wires in a manner to provide a terminal or lead at each end thereof.

From the foregoing description, it will be seen that the present invention provides a rapid and economical method of making spot-type elements. The elements so produced have identical and uniform electrical characteristics because they have been formed of exactly the same material with the wires therein spaced exactly the same distance apart in each batch, whereby the portion of the material providing the electrical resistance between the wires is identical in each element of the batch. The latter is made possible by the extruding apparatus which so spaces the wires without relying on the skill of an operator. Also, by salvaging the used material, the material cost of the elements is reduced to a minimum.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

This application is a continuation-in-part application of United States patent application Serial No. 660,213, filed May 20, 1957, now abandoned.

I claim:

1. The method of making a multiplicity of identical electrical elements having a conductive function under certain conditions of normal use, which method comprises compounding a soft, paste-like material consisting of a composition providing the conductive function of the elements; extruding the material as a continuous mass of uniform cross-sectional area throughout its length onto a pair of parallel, spaced apart electrically conductive wires of indefinite continuous length; notching the extruded mass while the mass is in soft condition at a multiplicity of lengthwise predetermined spaced points to form a multiplicity of bead-like sections of a predetermined length including spaced wanted sections of uniform length saparated by unwanted sections of uniform length; removing said unwanted sections from the wires; sintering the notched mass to fuse said wanted sections and adhere the same onto the wires; and severing each wire at one end of said wanted sections to separate said wanted sections and provide a multiplicity of identical electrical elements each having a pair of terminal wires.

2. The method according to claim 1, wherein one wire is severed at one similarly facing end of each of said wanted sections and the other wire is severed at the opposite end of each of said wanted sections.

3. The method according to claim 1, wherein both wires are severed at same facing end of each of said wanted sections.

4. The method according to claim 1, wherein the length of removed unwanted sections is greater than the length of said wanted sections to thereby provide terminal wires of greater length than the electrical elements.

No references cited.